United States Patent [19]
Kaneda

[11] Patent Number: 5,134,525
[45] Date of Patent: Jul. 28, 1992

[54] AUTOMATIC ZOOMING DEVICE
[75] Inventor: Naoya Kaneda, Kanagawa, Japan
[73] Assignee: Canon Kabushiki Kaisha, Tokyo, Japan
[21] Appl. No.: 780,400
[22] Filed: Oct. 23, 1991

Related U.S. Application Data
[63] Continuation of Ser. No. 460,577, Jan. 3, 1990, abandoned.

[30] Foreign Application Priority Data
Nov. 1, 1989 [JP] Japan ................................. 1-002836
[51] Int. Cl.⁵ ............................................. G02B 15/00
[52] U.S. Cl. ................................ 359/697; 354/400; 364/173
[58] Field of Search ............... 359/694, 693, 823, 695, 359/696, 697, 698, 699; 354/400, 402, 403; 364/173, 400

[56] References Cited
U.S. PATENT DOCUMENTS
| | | | |
|---|---|---|---|
| 4,156,933 | 5/1979 | Pandres, Jr. | 364/173 |
| 4,840,470 | 6/1989 | Ohtake | 359/699 |
| 4,861,146 | 8/1989 | Hatase et al. | 359/698 |
| 4,942,417 | 7/1990 | Miyazawa et al. | 354/400 |

Primary Examiner—Loha Ben
Attorney, Agent, or Firm—Fitzpatrick, Cella, Harper & Scinto

[57] ABSTRACT

In an automatic zooming device, an amount of movement of a focusing lens and that of a zooming lens are respectively monitored. When the focusing lens moves, a driving circuit drives the zooming lens to move until the monitored amount of movement of the zooming lens is brought into a given correlation to that of the focusing lens, so that automatic zooming can be accomplished with a very simple structural arrangement.

11 Claims, 16 Drawing Sheets

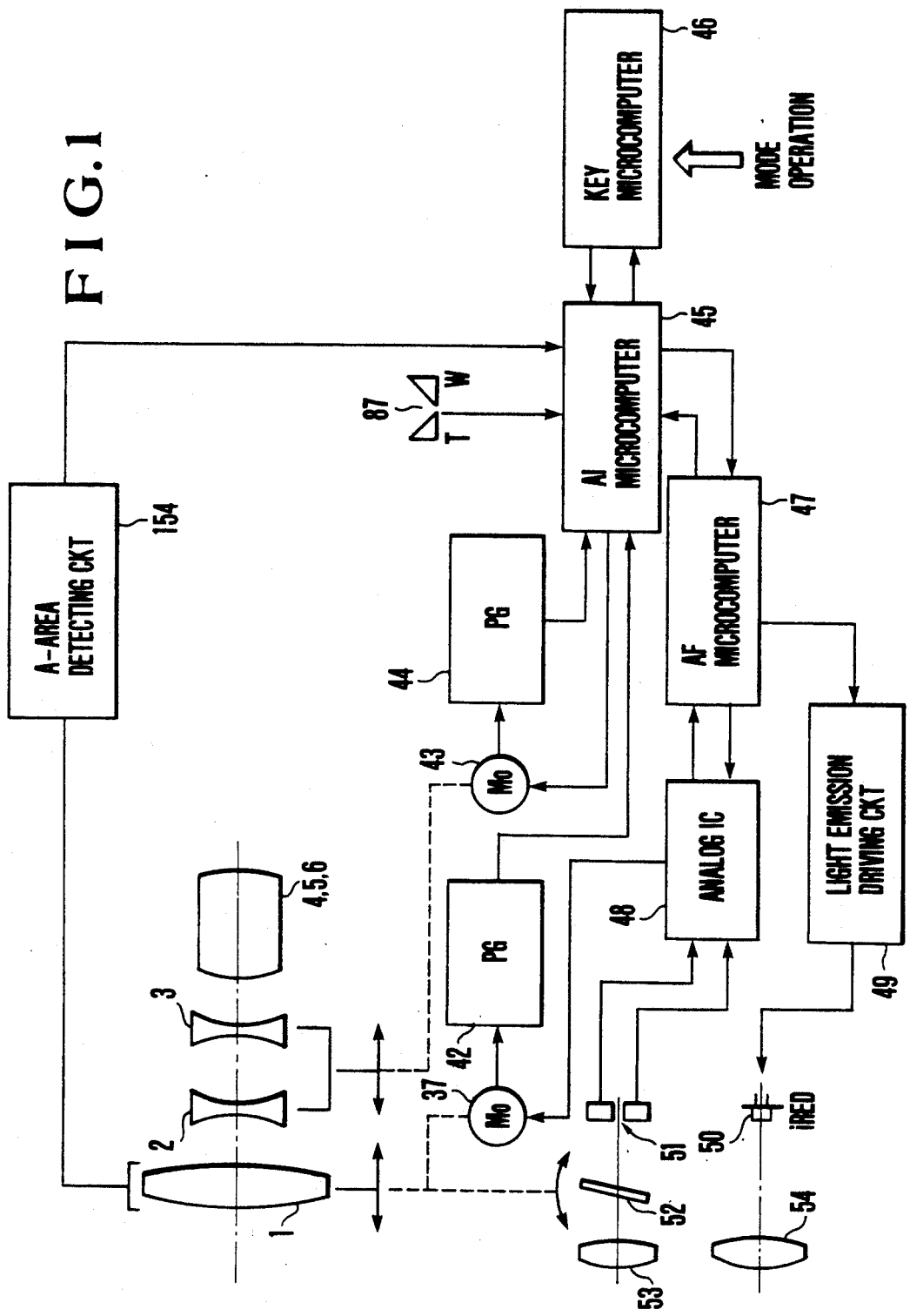

FIG.2(a) FIG.2(b)
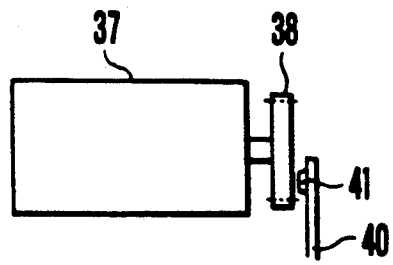
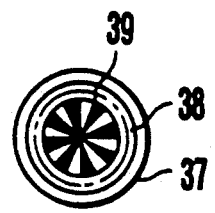
FIG.5
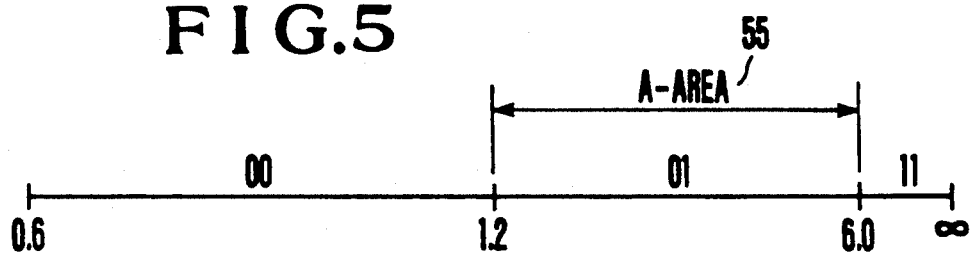
FIG.6
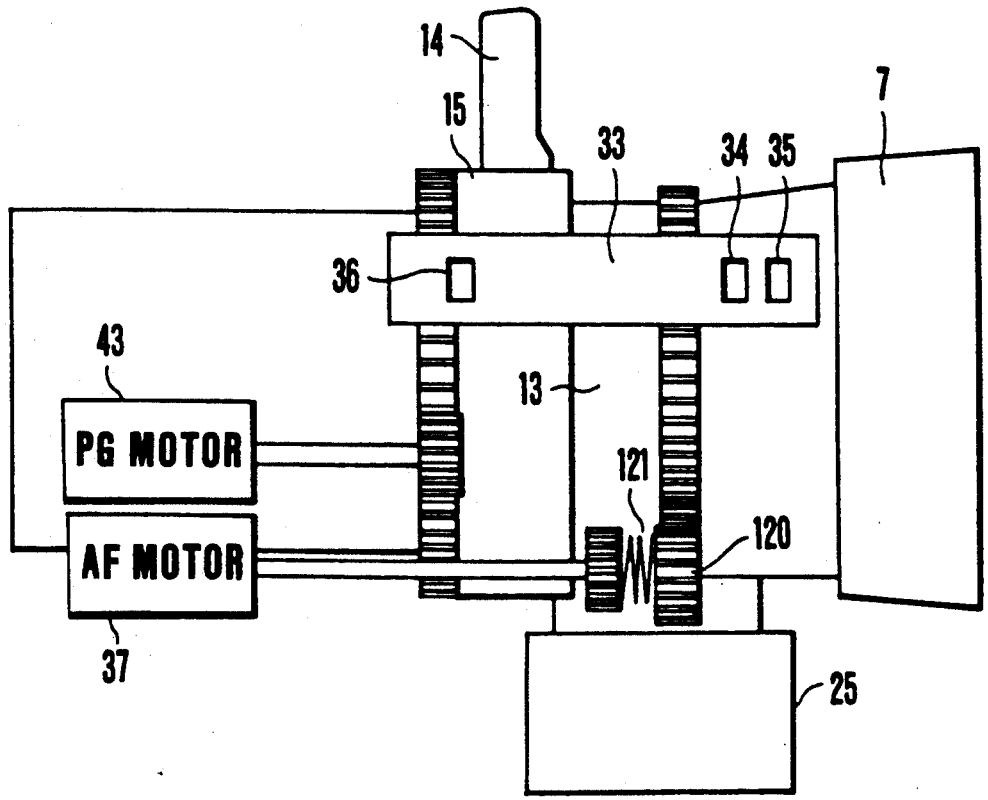

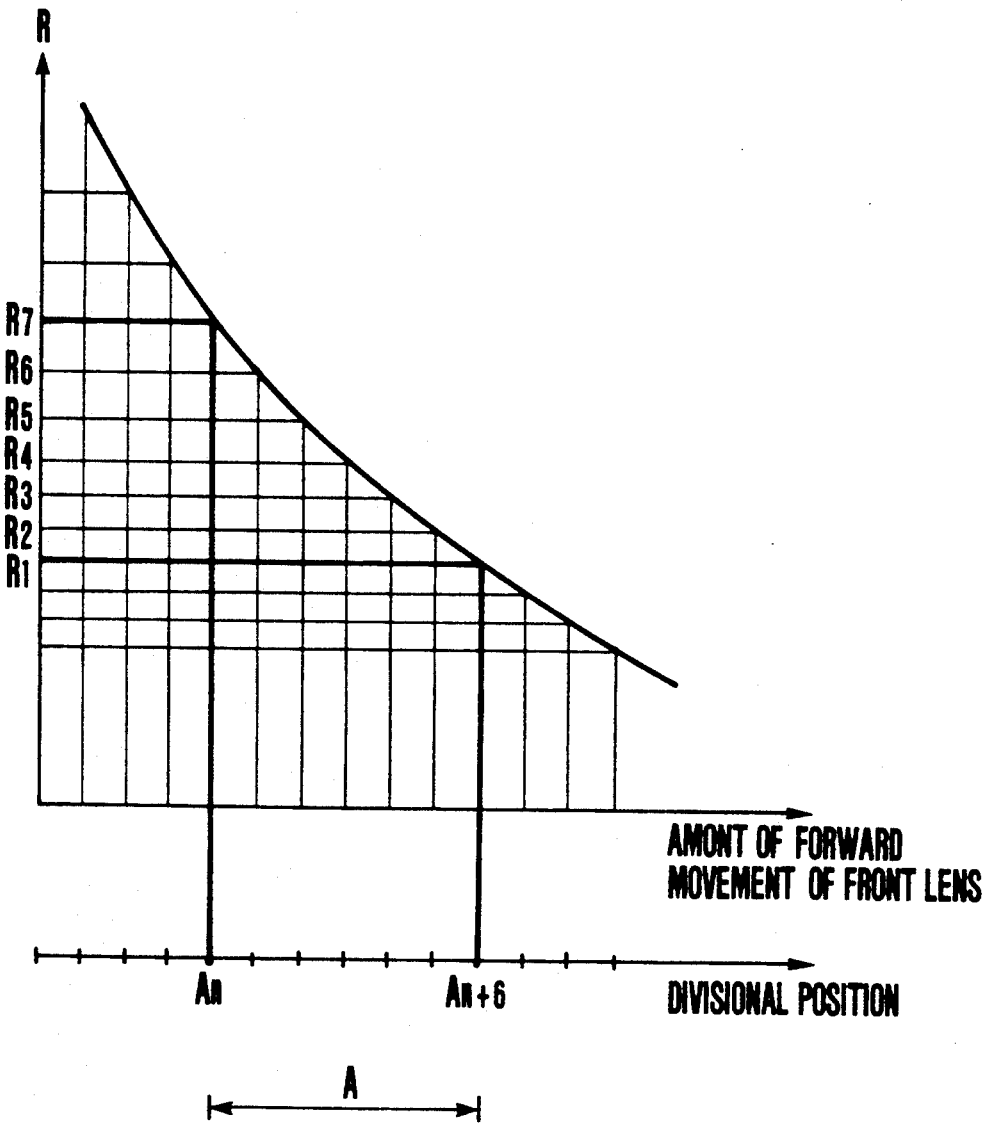

FIG.7
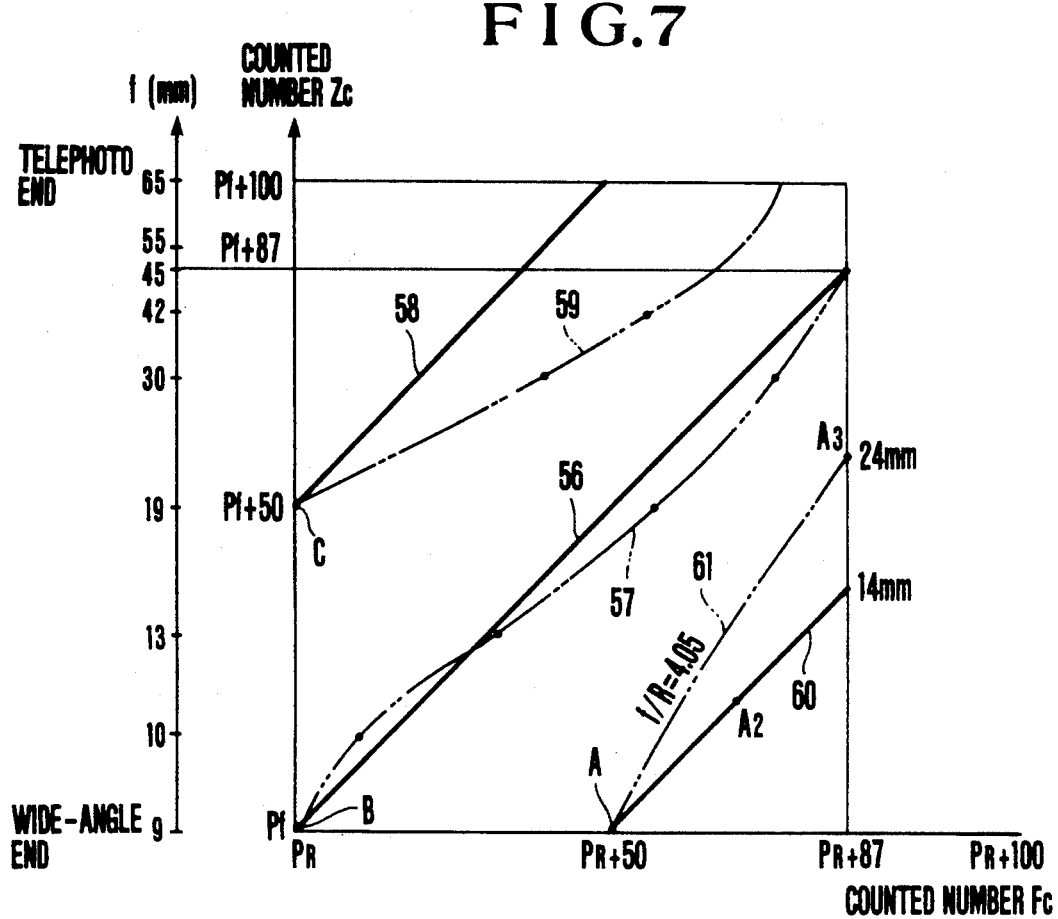
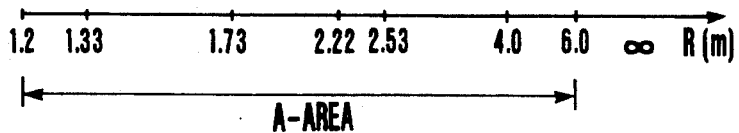

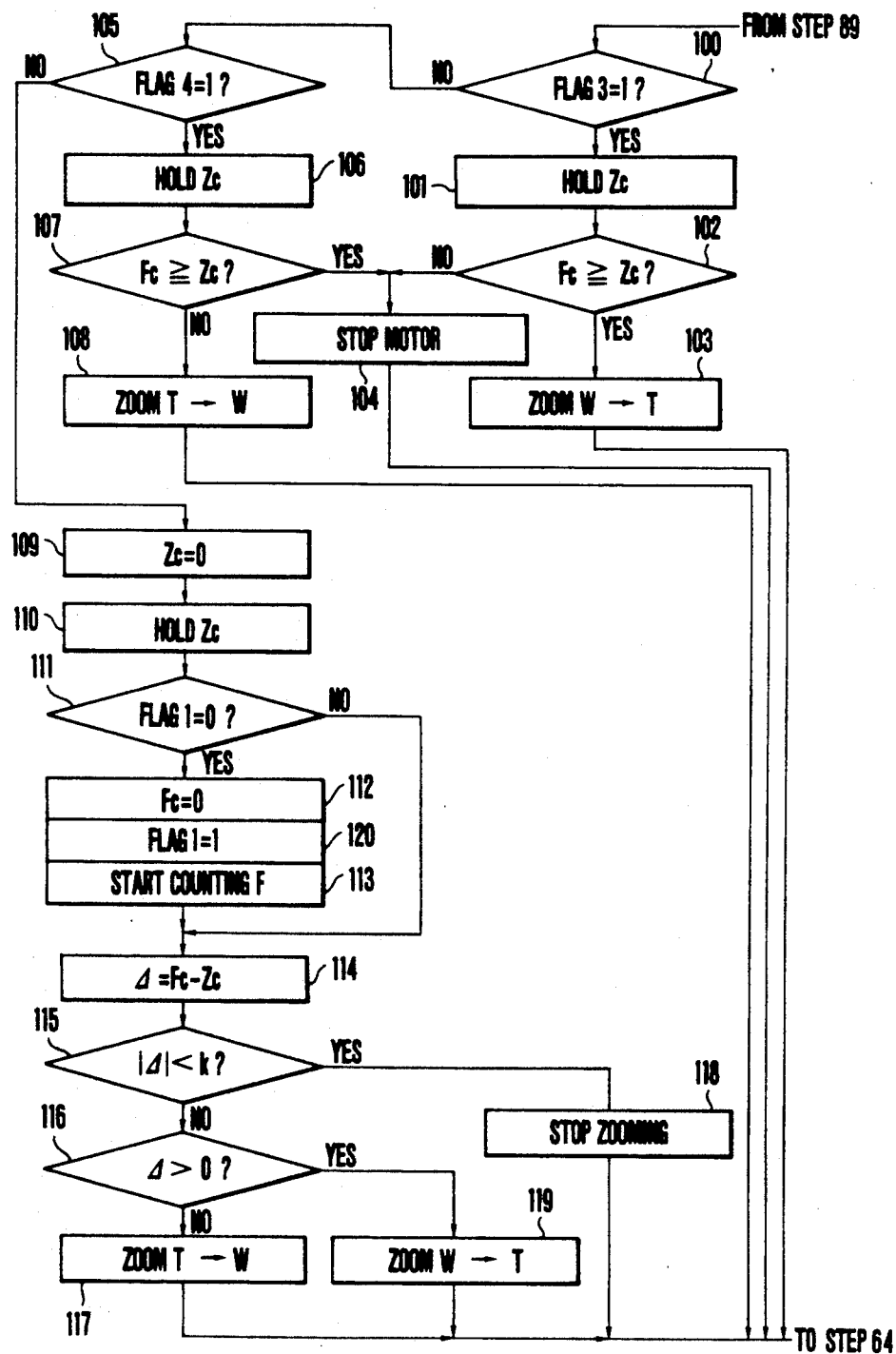

FIG. 9
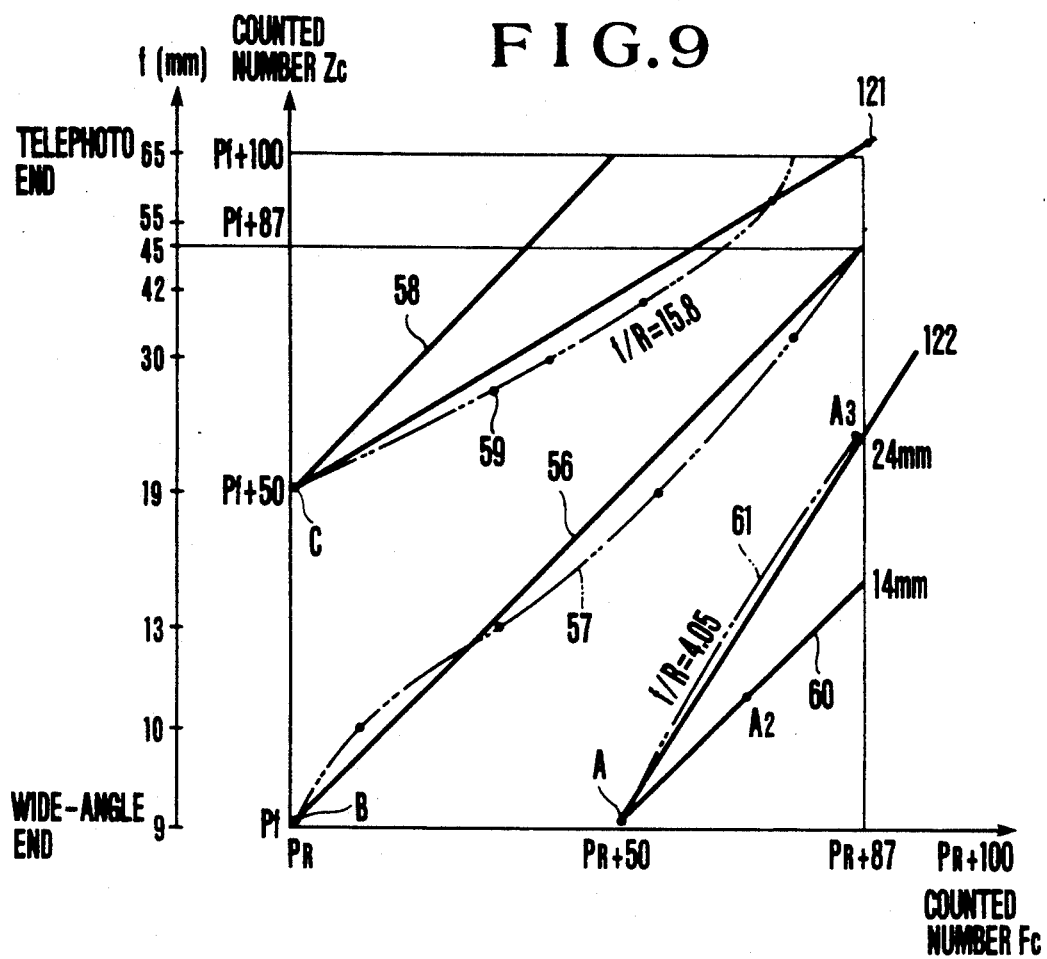
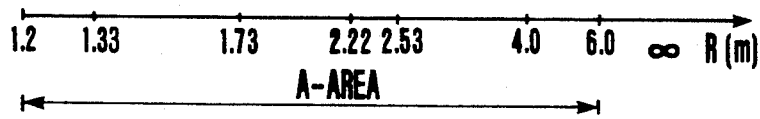
FIG. 10
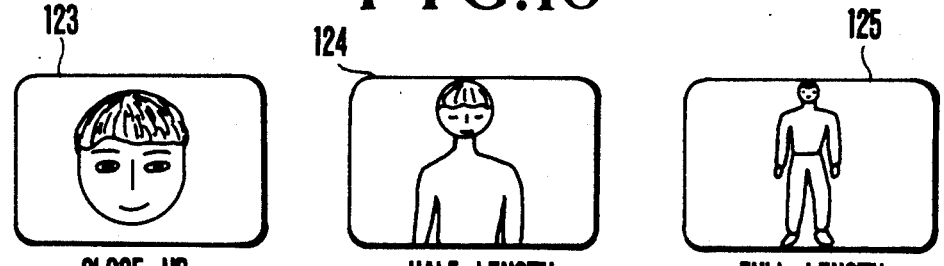

| REGION | I | II | III | IV |
|---|---|---|---|---|
| 34 | 0 | 0 | 1 | 1 |
| 35 | 0 | 1 | 1 | 0 |

A-AREA 0.6　　　　1.2　　2.22　6.0　∞

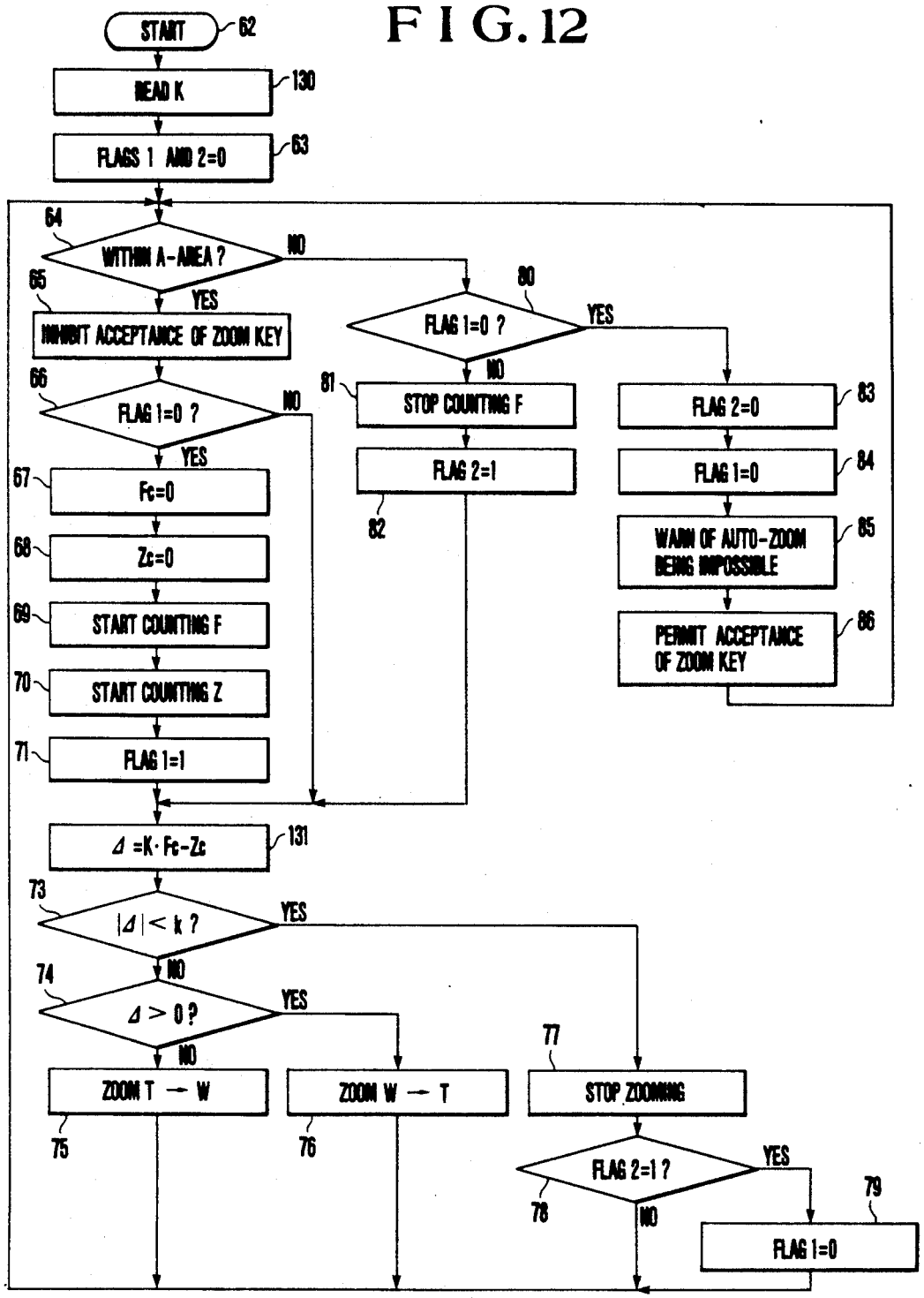

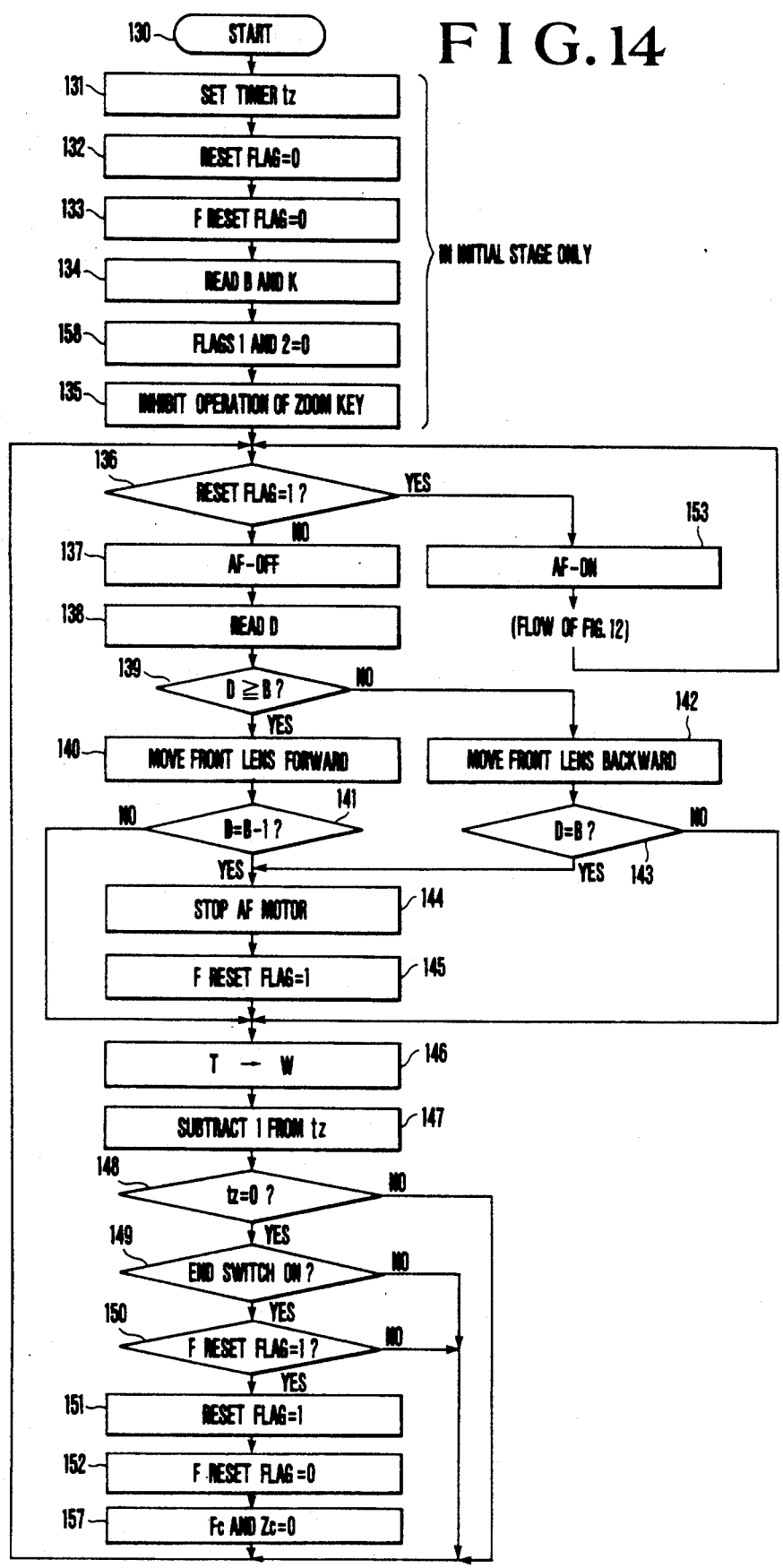

AMOUNT OF FORWARD MOVEMENT OF FRONT LENS, OR ROTATIONAL ANGLE

ROTATIONAL ANGLE OF ZOOM RING (CAM RING)

AUTOMATIC ZOOMING DEVICE

This application is a continuation-in-part of application Ser. No. 07/460,557 filed Jan. 3, 1990, now abandoned.

BACKGROUND OF THE INVENTION

1. Field of the invention

This invention relates to an improvement in a lens position control device which functions to automatically control the focal length of the lens in such a manner as to keep unvarying the ratio of area occupied within a picture plane by an object to be photographed even when a distance to the object changes.

2. Description of the Related Art

Generally, the conventional devices of this kind have been arranged to have the focal length "f", the object distance R and the size X of the area occupied by the object within the picture plane in a relation of "f"=f(R, X). In order to obtain the automatic zooming function, it is thus practiced in most cases to find the object distance R by means of an automatic focusing device or a device for detecting the absolute position of a focusing lens group, to compute the focal length "f" according to the object distance R and a predetermined value of the object size X and then to control the position of a power varying lens group. It is therefore necessary to accurately find the object distance R and the focal length "f" prior to the lens position control.

The above-stated arrangement of the conventional device, therefore, has the following drawbacks:

(1) It requires a complex structural arrangement for detecting an object distance R. (2) A complex arrangement is also required for detecting the focal length "f". (3) A CPU is required to perform complex control in computing the focal length "f" on the basis of the object distance R and the size X of the object within the picture plane.

The lens position control device, therefore, has been desired to have a simpler arrangement for its automatic zooming function. The details of the above-stated drawbacks (1), (2) and (3) are as described below:

FIG. 16 of the accompanying drawings is a sectional view showing the main part of a most typical four-group zoom type photo-taking lens. A lens group 1 (front lens) consists of focusing lenses 1-A, 1-B, and 1-C. A power varying lens group 2 (variator) consists of lenses 2-A, 2-B and 2-C. A lens 3 (compensator) is arranged to act in association with the variator 2. An afocal lens 4 is stationary. Image forming lens groups (relay lenses) 5 and 6 consist of lenses 5-A, 5-B and 5-C and lenses 6-A, 6-B and 6-C, respectively. A front-lens frame 7 is formed in one body with a female helicoid member 8. A reference numeral 13 denotes a stationary lens barrel.

The stationary lens barrel 13 has a helicoid thread formed along the outer circumference thereof. This enables the front lens 1 to be moved forward and backward in the direction of an optical axis when the front-lens frame 7 is rotated either by a drive source such as a motor or the like which is not shown or by a manual operation. With the front lens 1 thus moved, a focusing distance varies accordingly. In other words, a front-lens position adjusting means is formed jointly by the front-lens frame 7, the female helicoid member 8, the stationary lens barrel 13 and a motor or the like which is not shown.

The illustration further includes a lens frame 9 for the variator 2; a cam follower 10; a cam ring 11; a macrophotography operation knob 14; a zoom ring 15; a lens frame 17 for the compensator 3; a guide bar 18 for the lens frames 9 and 17 of the variator 2 and the compensator 3; a spring 19 which is arranged to push the cam ring 11; and a gear part 12 which is interlocked with the motor.

The position of the variator 2 and that of the compensator 3 are changed either by a drive source such as a motor which is not shown or by a manual operation on the zoom ring 15. This changes the focal length of the photo-taking lens. These parts jointly form a means for adjusting the positions of the power varying and compensating lens groups. More specifically, the rotation of the zoom ring 15 causes the rotation of the cam ring 11 which is fitted in the inner circumferential side of the stationary lens barrel 13. Then, the cam follower 10 causes the variator lens frame 9 and the compensator lens frame 17 to be guided by the guide bar 18 along a cam groove which is not shown but is provided in the cam ring 11. Then, zooming is effected with the position of these lens frames changed in the direction of the optical axis.

Further, there are provided a rail 20 for diaphragm blades 21 and 22; a relay lens holder 23; a relay lens frame 24; a main block 25 for an automatic focusing device; a spring 26; a base plate 27 for a light receiving element; a spacer 28; and a rotating shaft 29 for adjustment of the light receiving element.

FIG. 17 shows a relation between the amount of forward movement of the front lens 1 and a focusing distance (a distance between the focusing point of the front lens 1 moved forward, i.e., an in-focus point, and the front lens group 1). As shown, the amount of forward movement of front lens is approximately in proportion to the reciprocal of the focusing distance.

Therefore, the amount of forward movement of the front lens must be known for detecting the object distance R in connection with the drawback (1) mentioned in the foregoing. FIG. 18 is a front view showing an example of arrangement to meet this requirement. A brush 31 is secured by means of a screw 30 to the inner circumferential side of the front-lens frame 7. A pattern 32 is printed on the outer circumferential side of the stationary lens barrel 13. In a case where the position of the front lens is to be detected through a resistance value by employing a carbon resistor as the pattern 32, various causes for errors prevent the relation between the amount of forward movement of the front lens and the resistance value from being neatly expressed in a linear equation, as shown in FIG. 19. For example, there arises an error (Xk - Xo) relative to a resistance value ro. The acceptability of an encoder having this degree of accuracy depends on the degree of resolution of the encoder required for the automatic zooming function.

In addition to the variable resistance type method described above, it is also conceivable to detect the absolute position of the front lens by means of a brush 31 and a pattern 32 which are arranged as shown in FIG. 20. In this case, with the pattern 31 assumed to be consisting of an "n" number of pattern parts, the number of detectable areas are limited to $2^n$. Therefore, the acceptability of that arrangement also depends on the degree of resolution of the encoder required for the automatic zooming function.

Therefore, for a highly accurate automatic zooming function, it is necessary either to enhance the linearity of the resistance value of the carbon resistor or to increase the number of brushes. It is also necessary to compute the value R by obtaining the reciprocal of the result of detection.

In respect to the above-stated drawback (2), the focal length "f" is detected in the following manner: The position of the zoom ring is also detectable by the combination of a brush and a pattern like in the case of FIG. 18. FIG. 21 shows the detected value of the zoom ring as in relation to the focal length "f". Generally, an excessively large amount of movement of the lens relative to the unit rotational angle of the cam ring 11 brings about various problems such as unsmooth movement of the lens. Therefore, as shown in FIG. 7, the focal length "f" relative to a given rotational angle of the cam ring is arranged to change to a smaller degree at a wide-angle end position of the lens than at middle and telephoto-end positions. In order to find the focal length "f", therefore, a complex computing operation must be carried out by obtaining an approximate expression of the graph of FIG. 21.

In view of the foregoing, control by a CPU is performed as follows: The values R and "f" are first computed. Then, a required focal length "f'" is computed according to the formula "f'"=f (R, X). After that, a computing operation is again performed to obtain an encoder output value on the basis of the result of the computation. The position adjustment means is then controlled in such a way as to cause the encoder to produce its output at the above-stated value. Therefore, as described in respect of the drawback (3) in the foregoing, the computing operation of the CPU becomes complex.

SUMMARY OF THE INVENTION

It is one aspect of the invention under the present application to provide a so-called automatic zooming device having a first optical system for focusing and a second optical system for zooming which are interlocked with each other in such a way as to keep the ratio of an area occupied by an image of a photographed object to the whole area of a picture plane almost constant by driving the second optical system even when that ratio would vary due to the movement of the first optical system. The device comprises first detecting means for detecting an amount of movement of the first optical system; a second detecting means for detecting an amount of movement of the second optical system; and a control circuit for causing the second optical system to move until the second detecting means detects an amount of movement of the second optical system corresponding to the amount of movement of the first optical system detected by the first detecting means. The automatic zooming device which is arranged in this manner according to the invention is capable of performing automatic zooming with an extremely simple structural arrangement thereof.

It is another aspect of the invention under the present application that, in the automatic zooming device described above, the second optical system is arranged to be driven until the amount of movement detected by the second detecting means comes to satisfy a predetermined relation to the amount of movement detected by the first detecting means after commencement of an automatic zooming action.

It is a further aspect of the invention that, in the automatic zooming device described above, the amounts of movement detected by the first and second detecting means are arranged to be in the relation of a linear equation to each other; and the second optical system is arranged to be moved in association with the movement of the first optical system.

It is one aspect of the invention to provide an automatic zooming device which is arranged to prevent any faulty action by inhibiting a normal zooming action while an automatic zooming action is in process.

It is one aspect of the invention to provide an automatic zooming device which stops an automatic zooming action from driving a zooming lens when the zooming lens has been moved to a limit position during the process of automatic zooming.

It is one aspect of the invention to provide an automatic zooming device which is arranged to perform an automatic zooming action only when a focusing lens is within a predetermined range of positions.

Other aspects and objects of the invention will become apparent from the following detailed description of embodiments thereof taken in connection with the accompanying drawings.

BRIEF DESCRIPTION OF THE DRAWINGS

FIG. 1 is a block diagram showing a first embodiment of this invention.

FIGS. 2(a) and 2(b) are side and front views showing by way of example the arrangement of a pulse generator included in FIG. 1.

FIGS. 4(a) and 4(b) show the basic concept of automatic zooming of the same embodiment.

FIG. 5 shows an A-area set by the first embodiment.

FIG 6 is a side view showing by way of example the arrangement of an encoder employed in the first embodiment for detecting the absolute position of the distance ring and that of a zoom ring.

FIG. 7 shows the possible range of automatic zooming obtainable by the first embodiment.

FIGS. 8(a) and 8(b) are flow charts showing the operation of a second embodiment of the invention.

FIG. 9 shows the automatic zooming possible range of a third embodiment of the invention.

FIG. 10 shows by way of example the mode selection keys of the third embodiment.

FIG. 12 is a flow chart showing the operation of a third embodiment of the invention.

FIG. 14 is a flow chart showing the operation of the fourth embodiment of the invention.

DETAILED DESCRIPTION OF THE PREFERRED EMBODIMENTS

Figure 3:
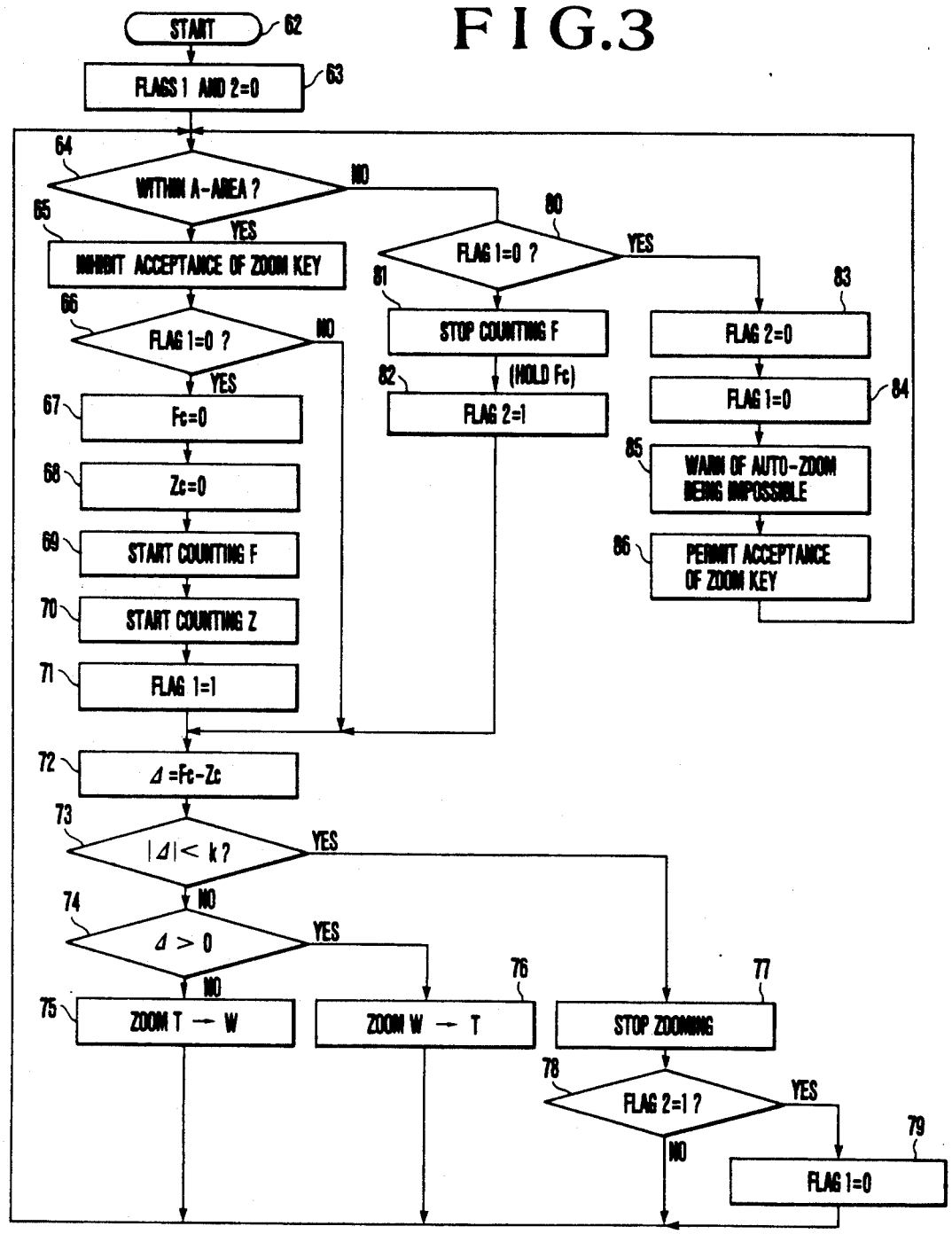
FIG. 3 is a flow chart showing the operation of the first embodiment of the invention.

The following describes the details of the invention through embodiments of this invention shown in the accompanying drawings, in which: FIGS. 1 to 7 show the first embodiment of the invention. Referring to FIG. 1, lens groups 1 to 6 are similar to the lens groups shown in FIG. 16. In the case of the first embodiment, the position of the front lens (or focusing lens group) is controlled by an automatic focusing device of the so-called external distance measuring active type. A microcomputer (hereinafter referred to as an AF microcomputer) 47 is provided for automatic focusing. A light emission driving circuit 49 is arranged to drive an iRED 50 to emit light in a predetermined cycle in accordance with an instruction given thereto. A light projecting lens 54 is arranged to project a light spot image of the iRED 50 onto an object to be photographed. A light receiving lens 53 is arranged to receive the projected light of the iRED 50 after the light impinges on and is reflected by the object. A parallel flat plate 52 is arranged to change its rotating angle position thereof according to the position of the front lens. A light receiving element 51 has its light receiving area divided into two areas. An analog IC 48 is arranged to perform detecting and integrating actions in synchronism with the light emitting action of the iRED 50 for finding the amount of light received within each of the two divided areas. The analog IC 48 includes a driving circuit for an AF (automatic focusing) motor 37.

Figure 16:
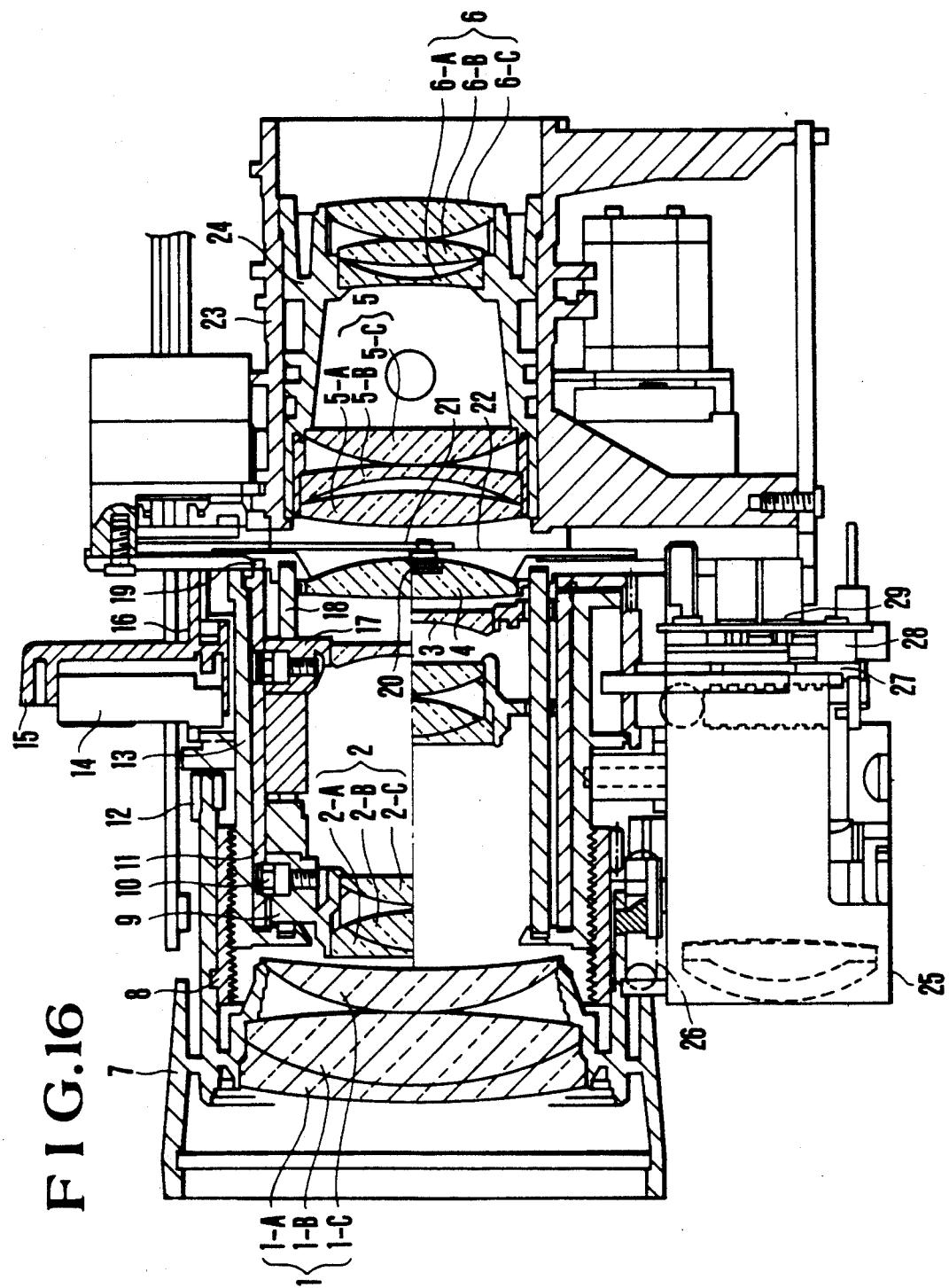
FIG. 16 is a sectional view showing the essential parts of a four-group type zoom lens employed in the conventional device as well as in the embodiment of the invention.

The AF microcomputer 47 determines a near-focus state, a far-focus state or an in-focus state on the basis of a signal formed by the analog IC 48 and also determines the direction and speed of rotation of the AF motor 37 accordingly. In the case of the in-focus state, the position of the front lens 1 relative to the angular position of the parallel flat plate 52 is kept unchanged so that outputs obtained from the two areas of the light receiving element 51 are almost equal to each other. As regards a mechanism for moving the front lens 1 forward and backward by the driving action of the AF motor 37 which is arranged to change the position of the front lens 1, a helicoid screw which is shown in FIG. 16 is generally employed. The AF motor 37 forms a first position adjustment means for adjusting the position of the front lens 1 in conjunction with the front-lens frame 7, the female helicoid member 8, the stationary lens barrel 13, etc. which are shown in FIG. 16.

A pulse generator (hereinafter referred to as a PG) 42 is arranged to detect the rotational frequency of the AF motor 37. FIGS. 2(a) and 2(b) show an example of arrangement of the AF motor 37. Referring to these figures, the AF motor 37 is provided with an output gear 38. A black-and-white pulse disc 39 has different reflection factors. A known photocoupler 41 is composed of a light emitting element and a light receiving element and is secured to a substrate 40. On the substrate 40 is formed a circuit which is arranged to count the number of pulses by binary-coding the output of light received.

The rotational frequency of the AF motor 37 is thus detected by the above-stated arrangement. The relative position of the front lens 1 is detected by this. Therefore, in this case, the PG 42 is deemed to be a first moving amount detecting means. Information on the position of the front lens 1 which is thus obtained by the PG 42 is supplied to an AI microcomputer 45 which controls automatic zooming.

The zooming operation is performed as follows: A reference numeral 87 denotes a zoom operation part. Information about an operation performed at this part is taken in by the AI microcomputer 45. The AI microcomputer 45 then drives a power zoom motor 43 on the basis of the direction and speed indicated by this information. The rotation of the power zoom motor 43 can be changed into a movement for changing the positions of the variator 2 and the compensator 3 by rotating the zoom ring 15 to cause the cam ring 11 to rotate, as mentioned in the foregoing by way of example with reference to FIG. 16. Therefore, a second position adjustment means is formed jointly by the power zoom motor 43, the zoom ring 15, the cam ring 11, the variator lens frame 9, the compensator lens frame 17, the cam follower 10, the guide bar 18, etc.. Another PG 44 is arranged in the same manner as the PG 42 which forms the first detecting means. The PG 44 thus forms a second moving amount detecting means. A key microcomputer 46 is arranged to transmit information about the start and stop of the automatic zooming function, those of the AF action, etc. to the AI microcomputer 45. In addition to this, the key microcomputer 46 receives information on each action that is performed by the AI microcomputer 45. An encoder 154 is provided for detecting an A-area and is arranged to serve as a first position detection means. The encoder 154 may be dispensed with as will be described later.

In the case of the embodiment shown in FIG. 1, the automatic focusing device is arranged by way of example to be of the external distance measuring active type. The automatic focusing device of course may be of some other type. Further, the embodiment may be arranged to have the position of the front lens 1 controlled by a manual operation without using any automatic focusing device. Further, the pulse disc 39 which is shown by way of example in FIGS. 2(a) and 2(b) is arranged at the output gear 38. However, in cases where there is provided a gear train, the pulse disc may be disposed at some other gear. In the event of a V belt linkage, the pulse disc may be formed at a pulley. Further, the arrangement of the PG may be changed to print a pulse pattern on the periphery of the zoom ring or the distance ring. Further, the AI microcomputer 45, the AF microcomputer 47 and the key microcomputer 46 may be consolidated into one microcomputer.

The automatic zooming function of the embodiment of the invention described above is carried out with the AI microcomputer 45 in a manner as described below with reference to FIG. 3 which is a flow chart:

At a step 62 of the flow chart: An automatic zooming operation begins. This is triggered by a manual key operation performed to instruct the key microcomputer 46. At a step 63: A flag 1 and another flag 2 are both set at "0". This is an initial setting action performed immediately after commencement of the automatic zooming operation. A next step 64 and steps ensuing on the step 64 are repeated, for example, in synchronism with one field period. At the step 64: The position of the distance ring is checked by the first position detecting means to find if it is within a range called an A-area.

The concept concerning the A-area is as follows: The arrangement to find an object distance on the basis of the position at which the focusing lens group of the photo-taking lens is in repose, like in the case of this embodiment, means that the in-focus detecting capacity of the automatic focusing device or the blur discerning capacity of the human eye is substituted for a distance measuring arrangement. Therefore, the distance discerning capacity is poorer for a far distance than for a near distance. For example, an error of plus or minus 10 cm is hardly detectable for a point located at a distance of 10 m while the same degree of error is detectable for a point located at a distance of 1 m. Further, with a distance measuring device of the active type used as in the case of the embodiment shown in FIG. 1, a distance to an object located at a far distance cannot be determined because the reachable distance of the light emitted by the device is limited. Meanwhile, it is a basic requirement for the automatic zooming function to meet a condition of "f/R=constant". For example, the device must be capable of making a discrimination between distances of 100 m and 200 m. Therefore, in the case of this embodiment which is arranged to determine a distance according to the position of the distance ring or the like, a range within which the automatic zooming function can be carried out must be limited.

Figure 4B:
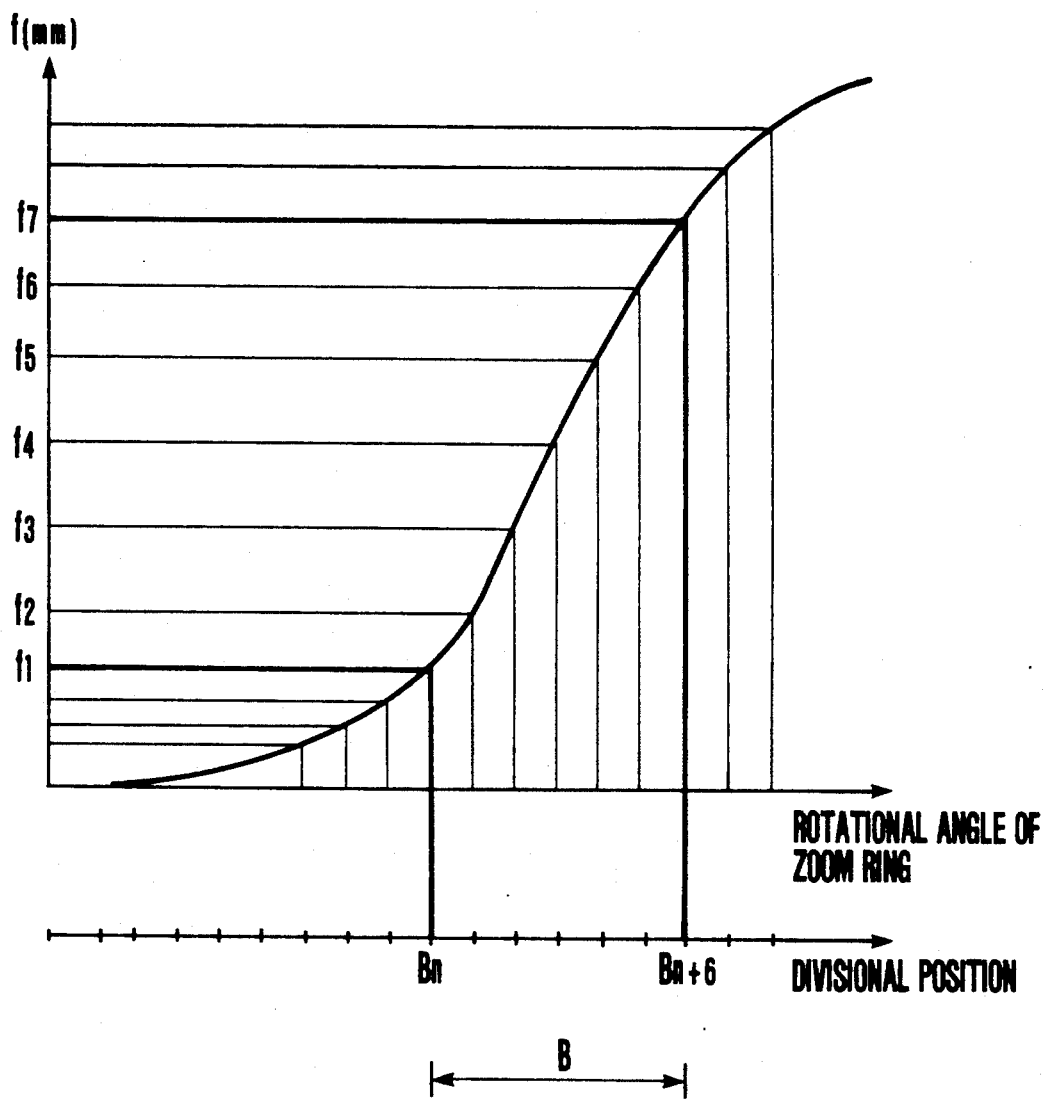

Further, the embodiment is arranged to control the focal length "f" to meet the condition of "f/R=constant" without carrying out the conventional complex computing operation by means of a microcomputer. Therefore, in addition to the above-stated requirement, the embodiment is required to limit the range of the controllable range of the focal length. More specifically, the requirement is as follows: FIGS. 4(a) and 4(b) show a relation between an amount of forward movement of the front lens and a focusing distance and a relation between a rotational angle of the zoom ring and a focal length. Referring to FIGS. 4(a) and r(b), when the amount of forward movement of the front lens and the rotational angle of the zoom ring are divided by pulses respectively under these relations, a range within which a condition of "fn/Rn=constant" can be satisfied including, for example, combinations of "R1 and f1", "R2 and f2", ..., and "R7 and f7" is considered to be the A-area. In other ranges, the focal length "f" for one pulse greatly varies and the condition "fn/Rn=constant" can be hardly satisfied.

In accordance with this, the divided position range A of the amount of forward movement of the front lens is correlated beforehand to the divided position range B of the rotational angle of the zoom ring. Under that condition, upon receipt of information that the front lens 1 is moved forward by an amount An, for example, the AI microcomputer 45 detects a position where the rotational angle of the zoom ring becomes Bn. If the amount of forward movement of the front lens is An+6, a position where the rotational angle of the zoom ring becomes Bn+6 is detected. This arrangement enables the embodiment to simply carry out automatic zooming without complex computation.

FIG. 5 shows a specific example of the A-area. In this instance, the focusing distances of 1.2 to 6.0 m are included in the A-area which permits automatic zooming. Further, this range is detectable, for example, by using photocouplers 34 and 35 provided on an absolute position detecting substrate 33 and a pattern (not shown) provided on the distance ring (the front-lens frame 7), as shown in FIG. 6. In this case, as shown in FIG. 5, the result of detection made by the photocoupler 34 is arranged to be indicated within the A-area, for example, as "0" and that of detection made by the other photocoupler 35 to be indicated as "1".

In another conceivable arrangement, instead of carrying out the process of determining the A-area, the embodiment may be arranged to let the operator know that the automatic zooming function is excused from working (or the lens may be zoomed to a position somewhat deviating toward the wide-angle side thereof) in the event of an object located at a far distance outside of the A-area. In that case, the absolute position detecting means which is shown in FIG. 6 as the first position detecting means is not necessary. Therefore, in that case, the block of the A-area detecting circuit 154 of FIG. 1 also becomes unnecessary. Further, the steps 64, 80 to 86, 78 and 79 of the flow chart of FIG. 3 also may be omitted.

When the position of the distance ring is found to be within the A-area at the step 64 of FIG. 3, the flow of operation comes to a step 65. At the step 65: A zoom key (a zooming operation member 87) is inhibited from accepting any instruction. This step is provided for the purpose of allowing the AI microcomputer 45 to perform control over the focal length.

This arrangement of the step 65 may be changed to suspend the automatic zooming function if the zoom key is operated. In the case of that modification, the step 65 is replaced with a step at which a check is made to see if the zoom key has been operated. If the zoom key is found to have been operated, the routine comes to an end (the program of FIG. 3 is returned to the start).

At a step 66: A check is made to find whether the flag 1 is at "0". If so, the flow comes to steps 67 and 68 to set the pulse numbers Fc and Zc also at "0" respectively for the positions of the distance ring and the zoom ring under that condition. At steps 69 and 70: Pulses produced by the pulse disc begin to be counted. At a step 71: The flag 1 is set at "1". At a step 72: A difference $\Delta$ ($=Fc-Zc$) between the pulse counted number Fc for the distance ring and the pulse counted number Zc for the zoom ring is obtained. At a next step 73: The value $|\Delta|$ is checked to find if it is less than a given value of dead zone "K". If so, the automatic zooming function is not required to begin and the flow comes to a step 77 to bring the power zoom motor 43 to a stop. In other words, since the pulse numbers Fc and Zc have respectively been set at "0" at the steps 67 and 68, the zooming action is stopped until the position of the front lens 1 is changed thereafter by the first position adjustment means. At a step 78: The flag 2 is checked to find if it is at "1". Since the flag 2 is at "0" in the initial stage, the result of the check is "NO". The flag 2 comes to show "1" only in a case where the object which is at first within the A-area comes to the outside of a distance range covered by the A-area after the commencement of automatic zooming. In that case, the counted number Fc for the distance ring is held at a value obtained the instant the object location comes to the outside of the A-area. Then, the power zoom motor 43 is driven until the counted number Zc for the zoom ring reaches the held counted number Fc. After that, the two motors concerned are brought to a stop. When the object again comes within the distance range covered by the A-area, both the counted numbers Fc and Zc are set at "0" and the motors are restarted. Steps 78 and 79 are provided for this purpose.

Meanwhile, if the result of the check made at the step 73 is "NO", the flow comes to a step 74 to check the difference $\Delta$ to see if it is a positive or negative value. Then, according to the result of this, the flow comes to a step 75 or to a step 76 to have the automatic zooming action carried out.

In a case where the object to be photographed happens to move from its initial location during execution of the program of FIG. 3, the embodiment operates as follows: The automatic focusing device which consists of the AF microcomputer 47, the iRED 50, the analog IC 48 and the AF motor 37 is operating independently of the automatic zooming function. When the object moves after commencement of automatic zooming, therefore, the automatic focusing device causes the motor 37 to move the front lens 1 for focusing on the object. The PG 42 produces pulses accordingly s the lens 1 moves. Meanwhile, counting by a counter has already begun to obtain the counted value (or number) Fc as mentioned in the foregoing. The counted value Fc is changed from "0" by the movement of the lens. As a result, at the step 72, the difference $\Delta$ (=Fc−Zc) between the counted values Fc and Zc comes to give a relation of $|\Delta|>k$. Then, the step 75 or 76 is executed according to whether the difference $\Delta$ is of a plus or minus value. As a result, the AI microcomputer 45 causes the motor 43 to rotate to move the lenses 2 and 3 for zooming. Then, the PG 44 produces pulses to change the counted value (or number) Zc from "0". A zooming action is thus performed accordingly as the object moves. The motor 43 works until the difference Fc−Zc=$\Delta$ becomes $|\Delta|<k$. The flow of operation comes to a step 77 to terminate the zooming action when the relation of $|\Delta|<k$ is attained. Within the A-area, as mentioned in the foregoing, the focusing distance R and the focal length "f" are set in a relation defined as shown in FIGS. 4(a) and 4(b). If the zoom ring is moved to an extent corresponding to one pulse output from the PG 44 when the position of the front lens is changed by the rotation of the motor 37 to an extent corresponding to one pulse output from the PG 42, the condition of "f/R=constant" is satisfied. Therefore, the automatic zooming action is carried out under the control which is performed in such a way as to satisfy this condition despite of any change in the location of the object to be photographed.

A step 80 and ensuing steps of FIG. 3 are provided for the flow of operation to be executed when the object is located at a distance outside the A-area. When the object distance is determined to be outside the A-area at the step 64, the flow comes to the step 80. At the step 80: A check is made for the state of the flag 1. If the object distance is outside the A-area immediately after commencement of the operation, the flag 1 is at "0". If the distance ring is rotated to a position which is outside the A-area during the process of automatic zooming, the flag 1 is at "1". If the flag 1 is found to be at "1", the flow comes to a step 81 to bring to a stop the counting for the value Fc (hereinafter referred to as F count). At a step 82: The flag 2 is set at "1". After that, the flow comes to the step 72 to perform the zooming action until the counted value Fc which has been held comes to give the relation of $|\Delta|<K$. Upon attainment of this relation, the flow comes to the step 77 to bring the power zoom motor 43 to a stop. In this instance, since the flag 2 has been set at "1" at the step 82, the result of the check made at the step 78 becomes YES. At the next step 79, the flag 1 is set at "0". After that, the result of a check made at the step 80 becomes YES, in the same manner as in case where the object distance is outside the A-area at the start of operation. Then, the flow comes to a step 83 to set the flag 2 at "0". At a next step 84: The flag 1 is set also at "0". At a step 85: An AZ (automatic zooming) inhibiting warning is given against automatic zooming. For example, the AZ inhibiting warning can be given by sending AZ inhibiting information from the AI microcomputer 45 to the key microcomputer 46 and by making a display on an electronic view finder (EVF) accordingly. The step 85 is dispensable. At a step 86: The zoom key may be allowed to accept an operation thereon.

In the first embodiment, as described above, both the position of the distance ring and that of the zoom ring which are detected at the start of automatic zooming by the first and second moving amount detecting means are used as initial values (both are zero in the case of the flow of FIG. 3). Then, the automatic zooming action is performed in such a way as to keep the counted values Fc and Zc equal to each other.

Figure 17:
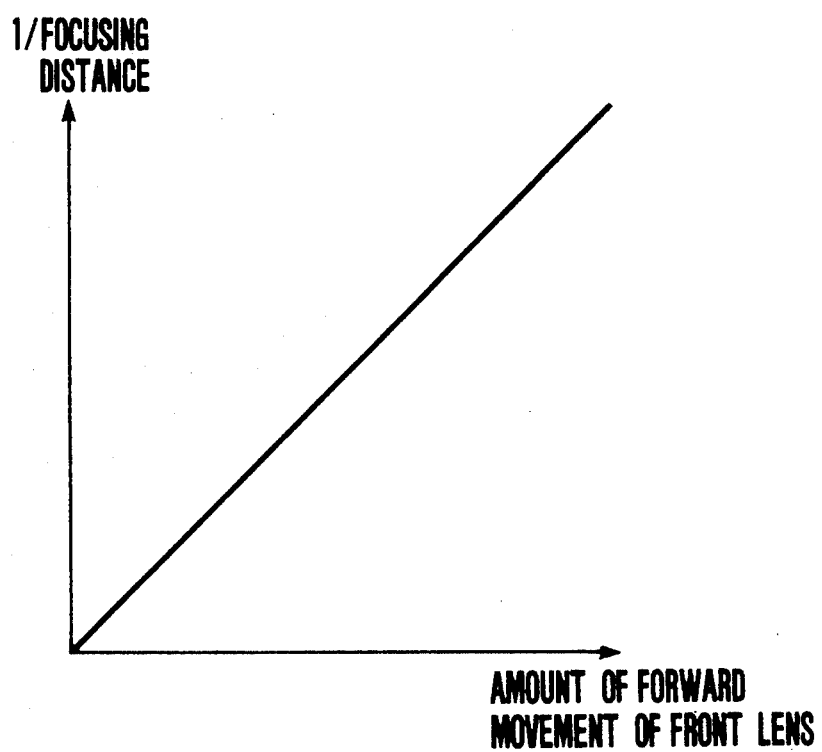
FIG. 17 shows an amount of forward movement of the front lens of the same four-group type zoom lens as in relation to the reciprocal of a focusing distance.
Figure 18:
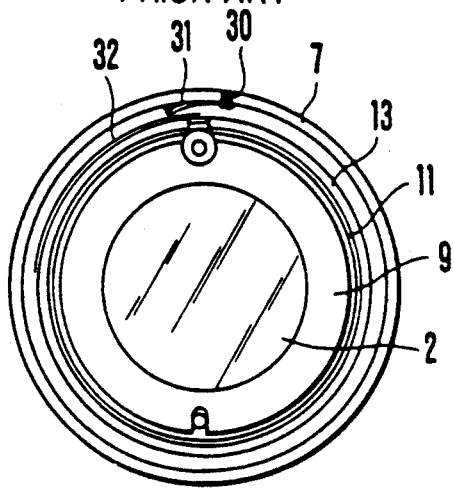
FIG. 18 is a front view showing by way of example the arrangement of the conventional encoder for encoding the absolute value of a distance ring.
Figure 19:
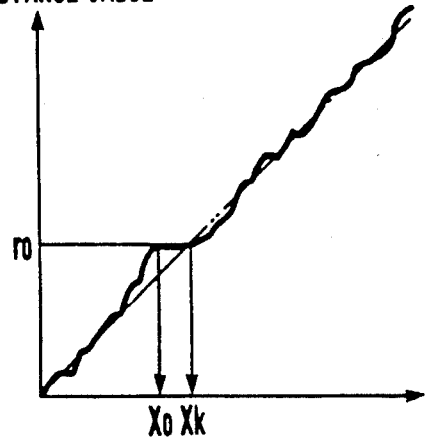
FIG. 19 shows the output characteristic of the conventional encoder of the variable resistance type.
Figure 20:
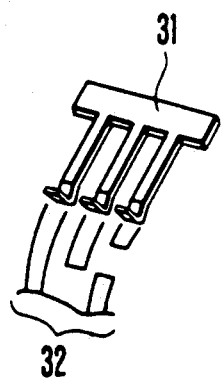
FIG. 20 is an oblique view showing by way of example the arrangement of a brush of FIG. 18.
Figure 21:
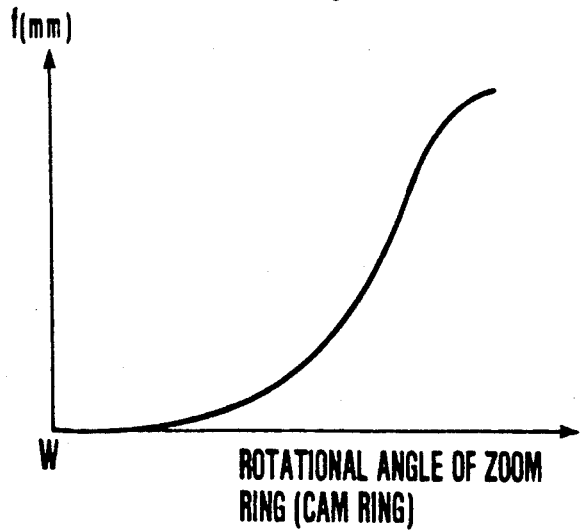
FIG. 21 is a graph showing a rotational angle of the zoom ring of the four-group type zoom lens of FIG. 16 as in relation to the focal length of the lens.

The details of the automatic zooming action are as described below with reference to FIG. 7:

In FIG. 7, the counted number Fc (of pulses) for the distance ring is shown on the axis of abscissa. With the number of pulses PR which is counted as the counted number Fc assumed to represent an object distance of 1.2 m and a number of pulses PR+87 a distance of 6.0 m, object distances 1.33 m, 1.73 m, 2.53 m and 4.0 m are plotted as shown in FIG. 7 according to the relation depicted in FIG. 17. Meanwhile, the other counted number Zc which is for the zoom ring is shown on the axis of ordinate. With the number of pulses Pf which is counted as the counted number Zc assumed to represent focal length of 9 mm and a number of pulses Pf+87 a focal length of 45 mm, other focal lengths become as shown in FIG. 7 according to the relation depicted in FIG. 21.

Again referring to the flow chart of FIG. 3, the automatic zooming action is further discussed as follows: Let us assume that, at the time of start of the automatic zooming action, the embodiment is at a point A of FIG. 7 where the focal length "f" is at 9 mm and the object distance R at 2.22 m. The initial setting action is performed under this condition to have the values Fc and Zc at "0". Therefore, in FIG. 7, the value PR is "−50" while the value Pf is "0". Then, to obtain the relationship of Fc=Zc under this condition, the operation according to the flow of FIG. 3 becomes as represented by a line 60 in FIG. 7. For example, a state of Fc=0 and Zc=0 is obtained by having PR=−50 and Pf=0 at point A. A state of Fc=20 and Zc=20 is obtained at another point A2. Meanwhile, the focal length "f" obtained at the point A is f (mm)/R (m) =9/2.22=4.05 and a line which makes this value constant is a line 61. For example, at a point A3, the focal length "f" is 24 mm and the object distance R is 6 m. They are in a relation of f/R=4. Whereas, in accordance with the arrangement of this embodiment, the focal length "f" is 14 mm for the same object distance of 6.0 m and thus somewhat deviates toward shorter focal length values. Therefore, if the automatic zooming action begins at the point A under the condition of f/R=4.05, automatic zooming cannot be adequately accomplished although the lens position is zoomed toward the wide-angle side when the object comes nearer and toward the telephoto side when the object moves away. However, in a case where the start of automatic zooming is made at the point B (where F=9 mm and R=1.2 m), there obtains the condition of PR=Pf=0 and a line 56 attainable by the embodiment approximately coincides with a curve 57 which gives a state of f/R=7.5.

In the event of start at a point C, an error occurs as represented by lines 58 and 59. Therefore, in accordance with the arrangement of this embodiment, it is impossible to perform automatic zooming with the image of an object set at an arbitrary size within the picture plane. However, on the line 57 of f/R=7.5 including the point B as shown in FIG. 7, the automatic zooming function can be adequately accomplished by simply attaining the state of Fc=Zc without necessitating the complex arrangement required by the conventional device.

Therefore, if the photographer allows automatic zooming to start under the condition of f/R=7.5 (in the case of a camera having an image size of ½ inch, a picture of upper half of a person or thereabout can be taken under this condition), the automatic zooming function can be attained with a very simple arrangement.

Further, it is conceivable to bring the line 56 closer to the line (or curve) 57 by correcting the cam lift value of the cam ring 11 mentioned in the foregoing with reference to FIG. 16.

As described above, the first embodiment of this invention is characterized by the simple arrangement for the automatic zooming function. The first embodiment includes the concept of arranging the A-area at the distance ring. A second embodiment which is described below is characterized by measures arranged to be taken when the zoom ring reaches its end position during the process of automatic zooming.

Figure 8A:
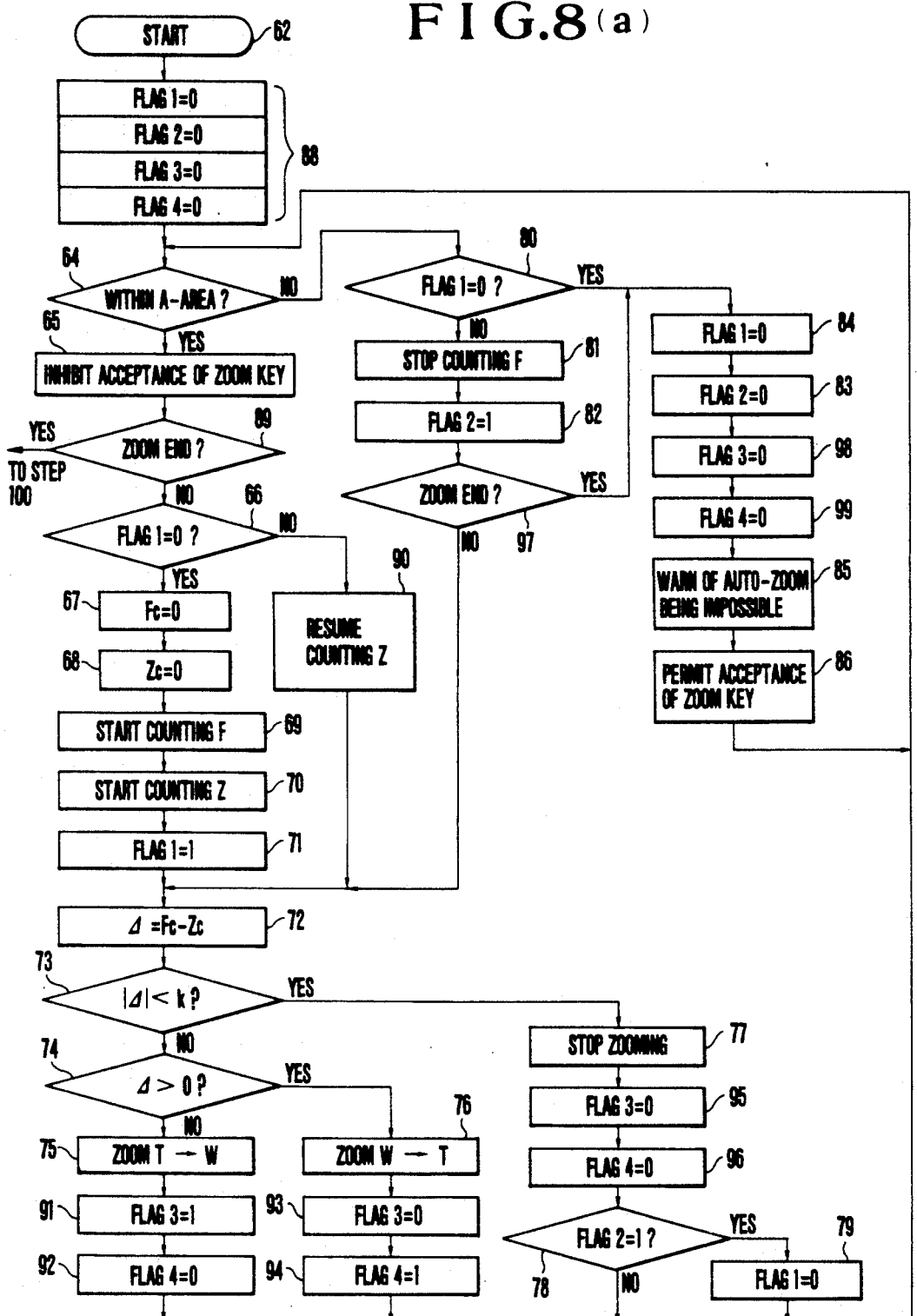

FIGS. 8(a) and 8(b) are flow charts showing the operation of the second embodiment performed with the AI microcomputer 45 which is shown in FIG. 1. The flow of operation includes the measures to be taken at the zooming end. In FIG. 8, the same step numbers are used for the same actions and processes as the flow chart of FIG. 3.

When the zoom ring comes to its end position, a slip mechanism which is composed of the spring 121 and the gear 120 of FIG. 6 prevents the power zoom motor 43 from being locked and allows the motor 43 to further rotate. The pulse disc which is mentioned in the foregoing is disposed on the motor side of the slip mechanism. This allows the pulse disc to continue to generate the pulses even when the zoom ring reaches its end position.

In a conceivable method for detecting the end of the zoom ring, a photocoupler 36 is disposed on a substrate 33 which is provided for detecting an absolute position, as shown in FIG. 6, and the end is detected through a pattern printed on the zoom ring. In this instance, since the photocoupler 36 gives one bit, it is impossible to make a discrimination between the long focal length (telephoto) end and the short focal length (wide-angle) end.

Referring to the flow charts of FIGS. 8(a) and 8(b), flags 1 to 4 are reset at "0" respectively at a step 88. The flow comes to a step 89 through steps 64 and 65 if the object distance is within the A-area. At the step 89: A check is made to find if the zoom ring is at its end. If so, the flow comes to steps 100 and 105 to make a check for the states of flags 3 and 4. If the step 75 is executed during the process of automatic zooming, the flag 3 is set at "1" and the flag 4 at "0" at steps 91 and 92 respectively. If the step 76 is executed during automatic zooming, the flag 3 is set at "0" and the flag 4 at "1" at steps 93 and 94. Therefore, when the flags 3 and 4 are checked for their states at the steps 100 and 105, the end position reached during the process of automatic zooming can be determined to be the wide-angle end or to be the telephoto end at the steps 100 and 105. If the flag 3 is found to be at "1" at the step 100, thus showing arrival at the wide-angle end, the flow proceeds to a step 101 to hold the counted number Zc. After that, the counted number Zc is no longer counted up and down even if the pulse disc is allowed to rotate by the slip mechanism. At a step 102: The other counted number Fc is compared with the held counted number Zc. In the case of the wide-angle end, automatic zooming is performed toward the telephoto end if the counted number Fc is found to be equal to or larger than the counted number Zc. If the result of the check made at the step 102 is YES, therefore, the flow proceeds to a step 103 to have the lens shifted toward the telephoto end. If the result of the check made at the step 102 is NO, the flow comes to a step 104 to bring the power zoom motor 43 to a stop.

If the result of the check made at the above-stated step 100 is NO, the flow comes to the step 105. At the step 105: The flag 4 is checked to see if it is at "1". If so, it indicates arrival at the telephoto end. Then, the flow comes to steps 106, 107 and 108 to allow automatic zooming toward the wide-angle end. If the result of the check made at the step 105 is NO, it indicates that the zoom lens is located either at the wide-angle end or at the telephoto end in the initial stage of the automatic zooming action. In this instance, it is impossible to make a discrimination between the wide-angle end and the telephoto end, although arrival at an end is detectable. Therefore, the counted number Zc is held at "0" and, after that, the power zoom motor 43 is driven according to the value of difference $\Delta$. As a result, the flow comes back to the normal routine after the zoom lens is moved away from its end position. At a step 109: The counted number Zc is set at "0". At a step 110: The counted number Zc is held and kept at "0". At a step 111: A check is made for the state of the flag 1. Since the flag 1 is at "0", in this instance, the flow comes to a step 112 to set the counted number Fc at "0". At a step 120: The flag 1 is set at "1". At a step 113: Counting the counted number Fc is allowed to start. At a step 114: The difference $\Delta$ is computed. However, since the counted number Zc is at "0", the difference $\Delta$ remains equal to the counted number Fc as long as the flow is in a routine ensuing the step 109. At a step 115: A check is made for a state of $|\Delta| < k$. Upon confirmation of this state, the flow comes to a step 118 to bring the motor to a stop. If the result of the check made at the step 115 is NO, the flow proceeds to a step 116. At the step 116: The difference $\Delta$ is checked to find if it is of a positive value or of a negative value. The flow comes to a step 117 or to a step 119 according to the result of the check. At the step 117 or 119: The power zoom motor 43 is driven to rotate in the applicable direction. When the zoom ring comes to escape from the end position as a result of the step 117 or 119, the result of the check made at the step 89 becomes NO. Since the flag 1 has been set at "1" at the step 120, the counted number Zc is released at a step 90 from the state of being held at "0". After that, the automatic zooming action is performed in the same manner as in the case of the first embodiment shown in FIG. 3.

Further, after the object distance is determined to be outside the A-area at the step 64, the flow of operation of the second embodiment is performed fundamentally in the same manner as the first embodiment described in the foregoing with reference to FIG. 3. However, it differs from the latter in that a check is made at a step 97 to see if the zoom ring is at its end position. If the result of this check is YES, it means that the distance is outside the A-area and the zoom ring is at its end position. It also means that the state of Fc=Zc cannot be obtained. In that event, the flow comes from the step 97 to steps 83 and 84 to bring the device into a so-called reset mode.

The insertion of the zoom end detecting step described above and particularly the addition of the steps 100 to 108 enable the second embodiment to follow the movement of the object at an angle of view obtained before arrival at the telephoto end or the wide-angle end when the object comes back to a distance which permits automatic zooming after arrival at the telephoto end or the wide-angle end during the process of automatic zooming. The performance of the first embodiment thus can be enhanced by the arrangement of the second embodiment.

While the automatic zooming function is attained only for a single value of f/R in the case of the first embodiment, a third embodiment of the invention is arranged to be capable of performing automatic zooming at least for two different values of f/R.

FIG. 9 shows in a graph the automatic zooming function of the third embodiment. In this case, lines 121 and 122 which are linearly proximate to the curves of f/R=4.05 and f/R=15.8 are provided in addition to the line (56) of FIG. 7 which shows the automatic zooming function of the first embodiment. While lines 56, 60 and 58 are obtained for the state of Zc=Fc, the line 121 is obtained for a state of Zc=Fc X 0.6 and the line 122 for a state of Zc=Fc X 1.6. The line 122 is linearly proximate to the line 61 of f/R=4.05 and the line 121 to line 59 of f/R=15.8.

As mentioned in the foregoing, for a camera having an image plane of ½ inch, the state of f/R=7.5 corresponds approximately to the half figure image of a person. Meanwhile, the state of f/R=4.05 approximately corresponds to the full figure image of a person and the state of f/R=15.8, for example, to a close-up image of a human face. In the case of the third embodiment, therefore, three mode keys 123, 124 and 125 are arranged as shown in FIG. 10. The value K of a formula Zc=K X Fc is set at "0.6" when the key 123 is pushed. The value K is set at "1" when the key 124 is pushed and at "1.6" when the key 125 is pushed. One of the different values of f/R thus can be selected as desired for automatic zooming. However, it is of course necessary to start automatic zooming by setting the combination of the value f (mm) and the value R (m) to actually obtain the value of f/R after the value K is determined. For this purpose, automatic zooming must be allowed to be carried out after one of the keys is selectively operated by the photographer to obtain a desired angle of view. For example, if the key 123 is selected, the lens must be first set into a state of having a close-up image of a face on the picture plane before the start of automatic zooming.

Figures 11, 13:
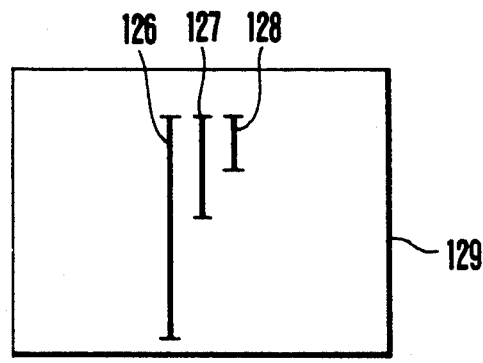
FIG. 11 shows a scale to be used in setting the size of an object image displayed within an electronic viewfinder (EVF) of the third embodiment.
FIG. 13 shows an encoder which is arranged in a fourth embodiment of the invention to encode the absolute value of a distance ring.

FIG. 11 shows a means for assisting the above-stated initial f/R setting action to be performed by the photographer. The EVF (electronic viewfinder) is arranged to display scales for face sizes relative to the picture plane size 129 of the EVF. The initial f/R setting value is adjusted to a scale 126 in selecting a close-up shooting mode and to another scale 127 or 128 in selecting the mode of taking the picture of a half- or full-figure image. This display within the EVF is preferably arranged to show only the applicable scale according to the mode selected. Further, the display is also preferably arranged to be put out after the start of automatic zooming.

FIG. 12 is a flow chart showing the operation of the AI microcomputer 45 which is shown in FIG. 1 and is employed in the above-stated third embodiment. The flow of FIG. 12 differs from the flow chart of FIG. 3 in the following points: At a step 130, the AI microcomputer 45 reads the value K which is set by operating one of the keys 123, 124 and 125 shown in FIG. 10; and, at a step 131, a computing operation is performed on a formula of $\Delta = K \times Fc - Zc$ on the basis of the value K. With the exception of these points, other steps are executed in the same manner as in the case of the embodiment shown in FIG. 3 and, therefore, the details of them are omitted from the following description.

Each of the embodiments described is arranged to have the photographer approximately set the size X to be occupied by the image of a photographed object within the picture plane. Whereas, in the case of a fourth embodiment which is described below, an angle of view selected by the photographer can be automatically set. In the case of the fourth embodiment, the two values f/R=7.5 and f/R=4.05 which are shown in FIG. 9 can be automatically set.

In automatically setting the value f/R=7.5, the distance ring and the zoom ring are first set at the point B of FIG. 9 (f=9 mm and R=1.2 m). Under this condition, both the counted numbers Fc and Zc are set at "0". In the case of f/R=4.05, the distance ring and the zoom ring are first set at the point A of FIG. 9 (f=9 mm and R=2.2 m) and, under this condition, the counted values Fc and Zc are set at "0". Therefore, the fourth embodiment requires the encoder which has the photocouplers 34 and 35 for detecting the absolute positions as shown in FIG. 6 must be arranged, for example, in a manner as shown in FIG. 13. Referring to FIG. 13, the focusing distances ranging from 0.6 to 1.2 m are set as an area I. Distances from 1.2 to 2.22 m are set as an area II. Distances from 2.22 to 6.0 m are set as an area III. Distances from 6.0 m to an infinity distance are set as an area IV. The output values of the photocouplers 34 and 35 are arranged to give values "00", "01", "11" and "10" for these areas I to IV. Since the distance ring is initially set at the position of 1.2 m in the case of f/R=7.5, it is located on a boundary between the areas I and II in this case. In the other case of f/R=4.05, the initial position of the distance ring is at 2.22 m which is a boundary between the areas II and III. A zone on the telephoto side of the necessary boundary position is assumed to be B. In other words, B=II in the case of f/R=7.5 and B=III in the other case of f/R=4.05. The following table shows this relation:

| Mode:    | Half figure | Full figure |
| -------- | ----------- | ----------- |
| f mm/R m:| 7.5         | 4.05        |
| B:       | II          | III         |
| K:       | 1           | 1.6         |

FIG. 14 is a flow chart showing the operation of the AI microcomputer 45 of FIG. 1 to be performed according to the arrangement of the fourth embodiment described above. In the flow chart, a symbol D represents the value of area currently obtained on the distance ring among the areas I to IV.

The operation begins at a step 130. Steps 131 to 135 are provided for initial setting. At the step 131: A timer tz is set. At the step 132: A reset flag is set at "0". At the step 133: An F reset flag is set at "0". At the step 134: The values B and K are read. At a step 158: The flags 1 and 2 are reset at "0." At the step 135: Any operation on the zoom key is inhibited. A step 136 and steps ensuing it are arranged to be repeated in synchronism with one field period. The value B read at the above-stated step 134 represents the area II of FIG. 13 which corresponds to the point B of FIG. 9.

At the step 136: The reset flag is checked to find if it is at "1". The reset flag is arranged to be at "1" upon completion of initial setting of the counted values (or numbers) Fc and Zc at the point A or B mentioned in the foregoing. The flow of operation reaches at least a step 137 for the initial round of the above-stated repeating routine. In order to shift the distance ring to a given position during the resetting process, it is necessary to suspend the position control over the front lens 1 which has been controlled according to a distance measured by the automatic focusing (AF) device. At the step 137, therefore, the AF device is turned off. In other words, the position control over the front lens 1 by the AF device is brought to a stop at the step 137. At a step 138: The value D (the value of applicable one of the areas I to IV) is read. At a step 139: The value D is checked to see if it is equal to or greater than the value of the data B. If so, it indicates that the distance ring is in a position of having a focusing distance which is farther than the focusing distance to be used for resetting (the area II, III or IV of FIG. 13). If not, the distance ring is in a position of having a near distance as the focusing distance (the area I of FIG. 13). Therefore, if the result of check made at the step 139 is YES, the flow comes to a step 140 to have the front lens 1 moved forward, that is, to shift the focusing distance to a nearer distance point. If the result of the check is NO, the flow comes to a step 140 to have the front lens 1 moved backward. In moving the front lens forward, a state of $D = B - 1$ indicates a limit. In moving the front lens 1 backward, a state of $D = B$ indicates a limit. In other words, the front lens 1 is allowed to be driven until there obtains the state of $D = D - 1 = I$ or a state of $D = B = II$ by detecting a change in the value D caused by a driving action on the front lens 1. This detecting process is carried out at a step 141 or 143. Upon arrival at the limit (or boundary), the motor is brought to a stop at a step 144. At a next step 145: The F reset flag which is arranged to indicate completion of shifting the distance ring to its reset position is set at "1". A step 146 and steps ensuing it are provided for resetting the zoom ring. In the case of this embodiment, the point B of FIG. 9 which is the reset position of the zoom ring is at $f = 9$ mm which is a wide-angle end. At the step 146, therefore, the power zoom motor 43 is driven in the wide-angle direction. At a step 147: The value of the timer tz is decremented by one. At a step 148: The timer tz is checked to see if it is at "0", because: The time set at the timer tz means that the zooming action continues in the wide-angle direction. These steps are provided for the purpose of preventing a telephoto end position from being mistaken for a wide-angle end position when the zoom ring happens to be in the telephoto end position at the beginning.

Therefore, if an end is detected at a next step 149, it means the wide-angle end. At a step 150: The F reset flag is checked to find if it is at "1". If so, it indicates completion of shifting both the distance ring and the zoom ring to their reset positions. At a step 151: The reset flag is set at "1". At a step 152: The F reset flag is set at "0". At a step 157: Both the counted numbers Fc and Zc are set at "0". Initial setting for automatic zooming is thus performed by these steps and is completed with the reset flag set at "1". After completion of the initial setting process, the control work on the front lens is handed over to the automatic focusing device at a step 153. After that, the flow comes to the step 64 of FIG. 12.

While the first, second and third embodiments of the invention are arranged to have the initial setting action for the angle of view performed by the photographer, the fourth embodiment is arranged to automatically carry out the initial setting action by the resetting process in the manner as described above. The fourth embodiment thus accurately performs automatic zooming.

The fourth embodiment is arranged to perform the resetting action according to the lines 56 and 122 of FIG. 9 as described by way of example in the foregoing. However, the initial setting can be accomplished also for another line 121 of FIG. 9. In that case, an encoding means for detecting the reset position as shown in FIG. 13 is provided also on the zoom ring. Then, for resetting, a flow of operation may be programmed in the same manner as in the case of the distance ring resetting program shown in FIG. 14.

Figure 15:
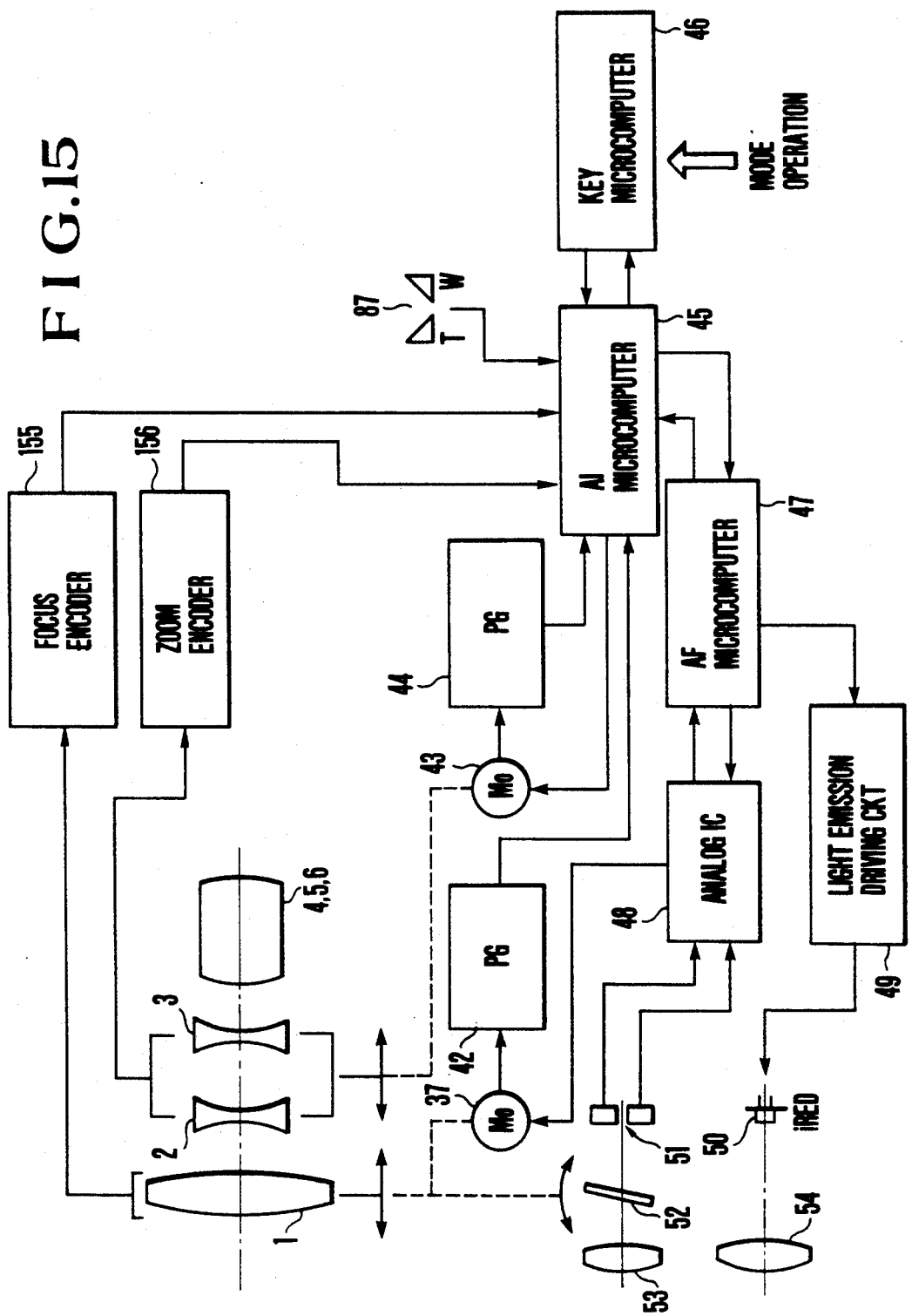
FIG. 15 is a block diagram showing the arrangement of the fourth embodiment.

In cases where use of encoders is necessary for detecting the absolute positions of both the distance ring and the zoom ring as mentioned above, a further embodiment of the invention is arranged as shown in a block diagram in FIG. 15. Referring to FIG. 15, a focus encoder 155 and a zoom encoder 156 are provided for detecting the absolute positions.

In the case of a photo-taking lens which has a zooming function and is to be used for a video camera or the like, the arrangement of the embodiments of this invention described in the foregoing has the following advantages: Assuming that the detection values obtained by the encoder which detects the changes of the relative (or absolute) positions of the pulse disc, etc. which are arranged to move in association with the movements of the focusing lens group and the zooming lens group are expressed as Fc and Zc, automatic zooming can be accomplished at least for one of the values determining the size of the image of a photographed object occupying the picture plane by just arranging the embodiment to satisfy the simple relation of $Zc = K \times Fc$ (see FIGS. 4(a) and 4(b). Further, the use of absolute value encoders which are simply arranged for both the distance ring and the zoom ring enables the embodiment to accomplish the automatic zooming action without necessitating the photographer to manually perform an initial setting operation for the angle of view.

What is claimed is:

1. A lens driving device having a first optical system for focusing and a second optical system for zooming, wherein said second optical system is driven in accordance with a movement of said first optical system, and comprising:
   a) first detecting means for detecting a movement of said first optical system;

b) second detecting means for detecting a movement of said second optical system; and c) a driving circuit arranged to be actuated to drive said second optical system when a movement of said first optical system from a predetermined position is detected by said first detecting means, wherein said driving circuit drives said second optical system by an amount which corresponds to the amount of the movement of said first optical system from the predetermined position.

2. A device according to claim 1, further comprising a control circuit that is arranged to detect the movement amount of said second optical system caused by said driving circuit after a drive of said second optical system has started, and controls the drive of said second optical system in such a manner that the difference between a movement amount of said second optical system and the movement amount of said first optical system is maintained in a predetermined relation.

3. A device according to claim 1, wherein said driving circuit is arranged to drive said second optical system in such a manner that, with said amount of movement of said first optical system assumed to be Fc and said amount of movement of said second optical system assumed to be Zc, a value of $KFc - Zc = \Delta$ becomes a predetermined constant value, where K represents a coefficient.

4. A device according to claim 3, further comprising a direction determining circuit for determining a direction in which said second optical system is to be driven, according to whether said value $\Delta$ is positive or negative.

5. A device according to claim 3, further comprising setting means for setting said coefficient K.

6. A device according to claim 1, further comprising a restricting circuit arranged to allow said driving circuit to act only when said first optical system is within a predetermined range of area in the whole movable area of said first optical systems.

7. A device according to claim 6, wherein, when said first optical system comes outside said predetermined range of area, said driving circuit performs driving control over said second optical system on the basis of said amount of movement of first optical system detected when said first optical system is moved to a given position within said predetermined range of area.

8. A device according to claim 1, further comprising an initial position control circuit arranged to cause said first and second optical systems to be shifted to their respective initial positions, said driving circuit being arranged to operate after said first and second optical systems are sifted to their respective initial positions.

9. A lens driving device having a first optical system for focusing and a second optical system for zooming, for driving said second optical system in accordance with a movement of said first optical system, comprising:

a) a driving circuit arranged to relate a movement of said second optical system with that of said first optical system and to drive said second optical system in accordance with the movement of said first optical system; and b) a restricting circuit arranged to render said driving circuit inoperative when said second optical system comes to a predetermined position while said second optical system is being moved by said driving circuit.

10. A lens driving device having a first optical system for focusing and a second optical system for zooming, for driving said second optical system in accordance with a movement of said first optical system, comprising:

a) a driving circuit arranged to relate a movement of said second optical system with that of said first optical system and to drive said second optical system in accordance with the movement of said first optical system;

b) zooming operation means for moving said second optical system independently of the movement of said first optical system; and c) an inhibiting circuit arranged to inhibit said zooming operation means from moving said second optical system while said driving circuit is in operation.

11. A lens driving device having a first optical system for focusing and a second optical system for zooming, for driving said second optical system in accordance with a movement of said first optical system, comprising:

a) a driving circuit arranged to relate a movement of said second optical system with that of said first optical system and to drive said second optical system in accordance with the movement of said first optical system;

b) an initial position control circuit arranged to shift said first and second optical systems to their respective initial positions; and c) a control circuit arranged to cause said driving circuit to start operating after said first and second optical systems are shifted to their respective initial positions.

* * * * *

UNITED STATES PATENT AND TRADEMARK OFFICE
CERTIFICATE OF CORRECTION

PATENT NO. : 5,134,525
DATED : July 28, 1992
INVENTOR(S) : NAOYA KANEDA It is certified that error appears in the above-identified patent and that said Letters Patent is hereby corrected as shown below:

Column 1:

Line 4, "continuation-in-part" should read --continuation--.

Line 5, "Ser. No. 07/460,557" should read --Ser. No. 07/460,577--.

Column 7:

Line 42, "r(b)," should read --4(b),--.

Column 9:

Line 20, "s the" should read --as the--.

Column 11:

Line 4, "F = 9 mm" should read --f = 9 mm--.

UNITED STATES PATENT AND TRADEMARK OFFICE
CERTIFICATE OF CORRECTION

PATENT NO. : 5,134,525

DATED : July 28, 1992

INVENTOR(S) : NAOYA KANEDA

Page 2 of 2

It is certified that error appears in the above-identified patent and that said Letters Patent is hereby corrected as shown below:

Column 17:

Line 40, "optical systems." should read --optical system.--

Column 18:

Line 2, "sifted" should read --shifted--.

Signed and Sealed this

Twenty-first Day of September, 1993

Attest:

BRUCE LEHMAN

Attesting Officer

Commissioner of Patents and Trademarks